United States Patent
Okamoto et al.

(10) Patent No.: US 8,115,362 B2
(45) Date of Patent: Feb. 14, 2012

(54) ROTATING ELECTRIC MACHINE HAVING FUSION BONDED STATOR CORE BLOCKS

(75) Inventors: Shogo Okamoto, Tokyo (JP); Kensaku Kuroki, Tokyo (JP); Tetsuya Amasaki, Tokyo (JP); Shoichiro Nishitani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 260 days.

(21) Appl. No.: 11/730,415

(22) Filed: Apr. 2, 2007

(65) Prior Publication Data
US 2008/0111443 A1    May 15, 2008

(30) Foreign Application Priority Data
Nov. 13, 2006   (JP) ................. 2006-306245

(51) Int. Cl.
*H02K 1/16* (2006.01)
*H02K 5/24* (2006.01)

(52) U.S. Cl. ... 310/216.135; 310/216.136; 310/216.113; 310/216.008; 310/216.001; 310/216.025; 310/254.1; 310/216.026; 310/216.027

(58) Field of Classification Search ........... 310/216, 310/216.001, 216.025, 216.026, 216.027, 310/254.1, 216.136, 216.135, 216.008, 28; 29/596, 598; *H02K 1/16*
See application file for complete search history.

(56) References Cited

U.S. PATENT DOCUMENTS

| | | | |
|---|---|---|---|
| 6,265,804 B1 * | 7/2001 | Nitta et al. | 310/216.066 |
| 6,366,000 B1 * | 4/2002 | Higashino et al. | 310/260 |
| 7,234,226 B2 * | 6/2007 | Fujita et al. | 29/598 |
| 2006/0125341 A1 | 6/2006 | Rau et al. | |

FOREIGN PATENT DOCUMENTS

| | | |
|---|---|---|
| DE | 19633399 A1 | 2/1998 |
| DE | 10321221 A1 | 12/2003 |
| DE | 10243985 A1 | 4/2004 |
| DE | 10243986 A1 | 4/2004 |
| DE | 60018364 T2 | 12/2005 |
| EP | 1246341 A2 | 10/2002 |
| JP | 2001-173731 A | 6/2001 |
| JP | 2001-211619 A | 8/2001 |
| JP | 2001-245446 A | 9/2001 |
| JP | 2005-539477 A | 12/2005 |
| WO | 2004032307 A1 | 4/2004 |

OTHER PUBLICATIONS

German Office Action Dated Mar. 5, 2009 for Co-pending Application.

* cited by examiner

*Primary Examiner* — Quyen Leung
*Assistant Examiner* — Terrance Kenerly
(74) *Attorney, Agent, or Firm* — Sughrue Mion, PLLC (57) ABSTRACT

An alternator can reduce the size of welding equipment and shorten the time of welding operation while ensuring high performance and high quality with the generation of electromagnetic noise being suppressed. The alternator includes a rotor having N poles and S poles alternately formed along a circumferential direction thereof, a stator core arranged so as to surround the rotor and having a plurality of axially extending slots formed at a predetermined pitch in the circumferential direction thereof, and a stator having a stator winding fitted into the slots. The stator core is formed by deforming by bending a hexahedral element iron core composed of iron core blocks with their adjacent ends being in abutment with each other and fusion bonded by welding. The weld portions of the blocks have a depth fusion extending at least up to a tensile region where a tensile stress of the stator core is generated.

8 Claims, 8 Drawing Sheets

ROTATING ELECTRIC MACHINE HAVING FUSION BONDED STATOR CORE BLOCKS

BACKGROUND OF THE INVENTION

1. Field of the Invention

The present invention relates to a rotating electrical machine having a stator core formed of steel plates that are deformed by bending into a cylindrical shape with their opposite end faces being fusion bonded to each other.

2. Description of the Related Art

In the past, as a rotating electrical machine in the form of a vehicular alternator, there has been known one which includes a rotor having N poles and S poles alternately formed along a circumferential direction thereof, a stator core arranged so as to surround the rotor and having a plurality of axially extending slots formed at a predetermined pitch in the circumferential direction, and a stator having a stator winding fitted in the slots, wherein the stator core is formed by first deforming through bending into a cylindrical shape an element iron core of a hexahedral shape, which is formed of a predetermined number of laminated rolled steel plates with their outer peripheries joined together by laser welding (lamination welding), and then fusion binding the opposite ends of the element iron core to each other while placing them into abutment with each other (see, for example, a first patent document: Japanese patent application laid-open No. 2001-245446 (FIG. 26 and FIG. 40)).

In this case, the attachment of the stator winding to the stator core is performed by inserting individual straight portions of groups of belt-shaped element wires, which together constitute the stator winding, into the individual slots, respectively, in the element iron core, so there are the following advantages. That is, the efficiency or easiness of the attachment is high, the damage of the stator winding is small, and the space factor of conductors of the stator winding in the slots is high.

In addition, the above-mentioned element iron core is divided into parts along a diametral or radial direction in a tooth formed between adjacent slots, respectively, and the dividing surfaces thereof are placed into abutment with each other and fusion bonded to each other. Thus, the following advantages are obtained. That is, the abutting operation in the abutment portions is simple and easy, and the dividing surfaces are along the direction of a main magnetic flux (diametral direction), so reduction in the output power of the alternator can be suppressed.

In the case of the above-mentioned stator core, the element iron core of the hexahedral shape is made into a cylindrical shape and its opposite end faces are welded together so as to be joined to each other, but a considerable force is required for bending the element iron core, and a spring back after bending of the element iron core is also strong, so a gap is liable to occur between the joining faces of the element iron core after the cylindrical formation thereof. If such a gap occurs and grows large, magnetic flux across the gap might be adversely influenced so that it might be disturbed to deteriorate magnetic noise, and in addition to this, a tensile force might be applied to coil ends of the stator winding fitted in the slots thereby to damage them.

In addition, it is known that the stator core fluctuates minutely in a diametral or radial direction thereby to worsen electromagnetic noise due to the resonance at the natural frequency of the stator with a magnetic exciting force generated when magnetic flux or electric current flows through the stator, but the stator core itself has most portions of its outer periphery exposed to the outside, and hence is not constructed so as to suppress the diametral resonance.

Figure 8:
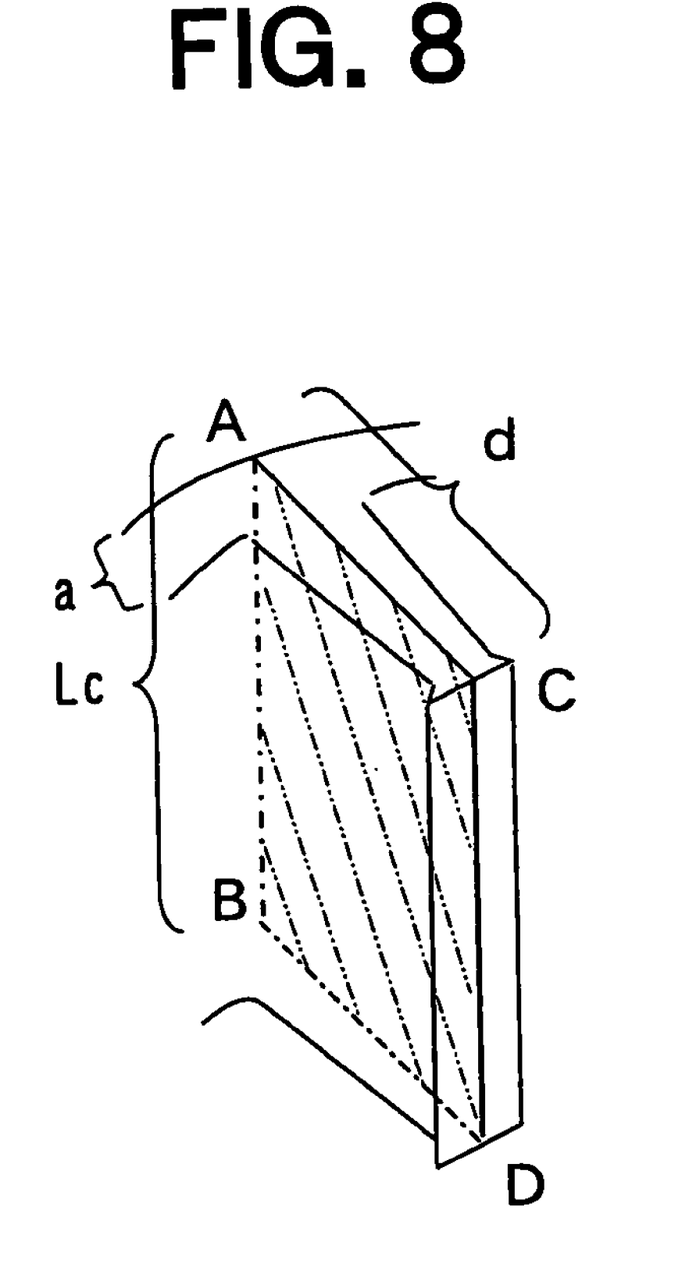
FIG. 8 is a perspective view showing abutment portions of a stator core which are fusion joined or bonded to each other.

As a countermeasure for such a problem, it is considered that the opposite end faces of the element iron core are strongly joined or bonded to each other by fusion bonding the entire surfaces (region of A-B-C-D) of the abutted portions in a tooth, as shown in FIG. 8.

Here, note that in FIG. 8, an axial length Lc of the stator core is longer than a diametral or radial length d thereof. This is because the diametral length d of the stator core is made shorter and the axial length Lc of the stator core is made longer to simply increase a region thereof through which magnetic flux passes, so as to meet a demand for increased output power and increased efficiency of an vehicular alternator in recent years.

In general, however, oxidation products are generated on the surfaces of the abutment portions fusion bonded to each other, and the oxides (e.g., $Fe_2O_3$ in case of rolled steel sheet) thus generated have a large resistance, so if such oxidation products extends over the entire width or length C-D of the diametrally inner peripheral surface of the tooth through which a main magnetic flux of a magnetic circuit passes, the performance is lowered undoubtedly, resulting in a major hurdle to the commercialization of the vehicular alternator.

Moreover, when the entire surfaces of the region A-B-C-D are fusion bonded to each other, eddy currents, which are suppressed by the lamination of a multitude of thin plates in the form of rolled steel plates, will flow into the region A-B-C-D, thus lowering the efficiency.

Further, to perform welding so as to fusion bond the entire surfaces of the region A-B-C-D to each other necessarily increases the time for welding operation and at the same time enlarges the size of welding equipment as well.

SUMMARY OF THE INVENTION

The present invention is intended to obviate the problems as referred to above, and has for its object to obtain a rotating electrical machine which is capable of reducing the size of welding equipment and shortening the time of welding operation while ensuring high performance and high quality with the generation of electromagnetic noise, etc., being suppressed.

Bearing the above object in mind, according to one aspect of the present invention, there is provided a rotating electrical machine which includes: a rotor having N poles and S poles alternately formed along a circumferential direction thereof; a stator core that is arranged so as to surround the rotor and has a plurality of axially extending slots formed at a predetermined pitch in the circumferential direction thereof; and a stator having a stator winding fitted in the slots. The stator core is formed in such a manner that the element iron core of a hexahedral shape is bent to deform with its opposite end faces, which are formed by dividing a tooth formed between adjacent slots of a plurality of iron core blocks, being fusion bonded to each other while being placed in abutment with each other. The depth of fusion of a block weld portion thus fusion bonded is at least up to a tensile region in which a tensile stress of the stator core is generated.

According to another aspect of the present invention, there is provided a rotating electrical machine which includes: a rotor having N poles and S poles alternately formed along a circumferential direction thereof; a stator core that is arranged so as to surround the rotor and has a plurality of axially extending slots formed at a predetermined pitch in the circumferential direction thereof; and a stator having a stator winding fitted in the slots. The stator core is formed in such a manner that the element iron core of a hexahedral shape is bent to deform with its opposite end faces, which are formed by dividing a tooth formed between adjacent ones of the slots, being fusion bonded to each other while being placed in abutment with each other. The depth of fusion of an element iron core weld portion thus fusion bonded is at least up to a tensile region in which a tensile stress of the stator core is generated.

According to a rotating electrical machine of the present invention, there are obtained the following advantage. That is, it is possible to reduce the size of welding equipment and shorten the time of welding operation while ensuring high performance and high quality thereof with the generation of electromagnetic noise, etc., being suppressed.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, vehicular alternators according to preferred embodiments of the present invention will be described in detail while referring to the accompanying drawings. Throughout respective figures, the same or corresponding members or parts are identified by the same reference numerals and characters.

Embodiment 1

Figure 1:
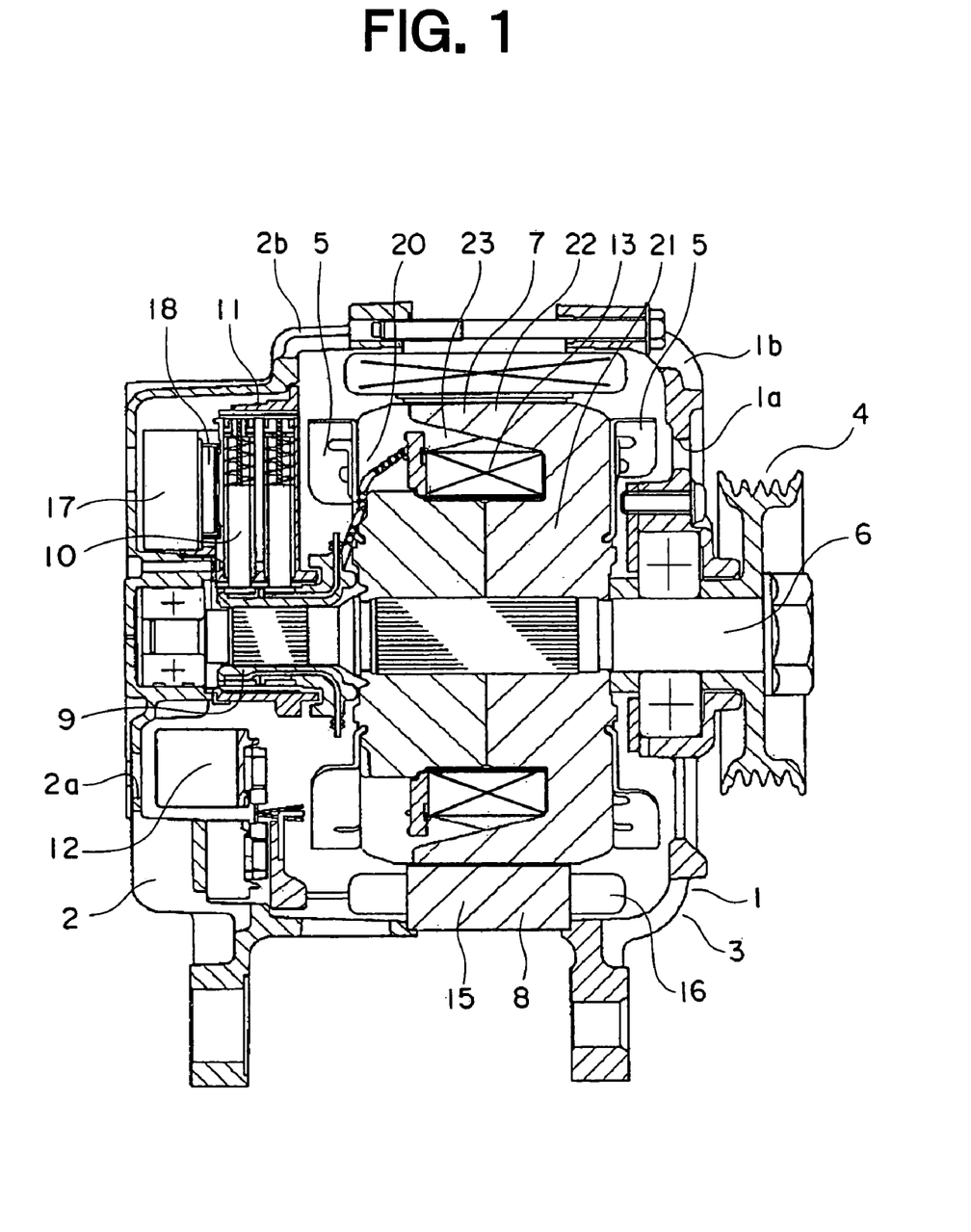
FIG. 1 is a cross sectional view of a vehicular alternator according to a first embodiment of the present invention.
Figure 2:
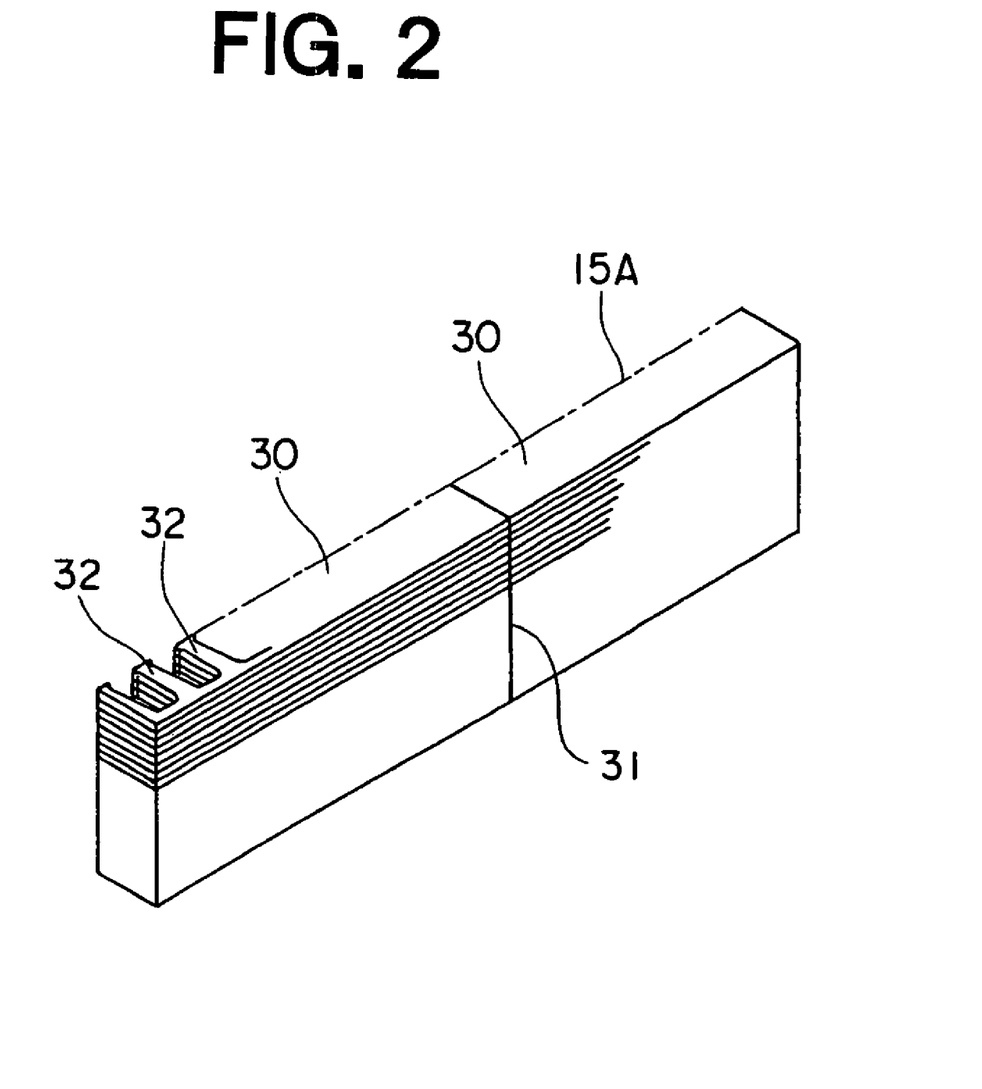
FIG. 2 is an overall perspective view of a preliminary process in which a stator core of FIG. 1 is to be deformed by bending.
Figure 3:
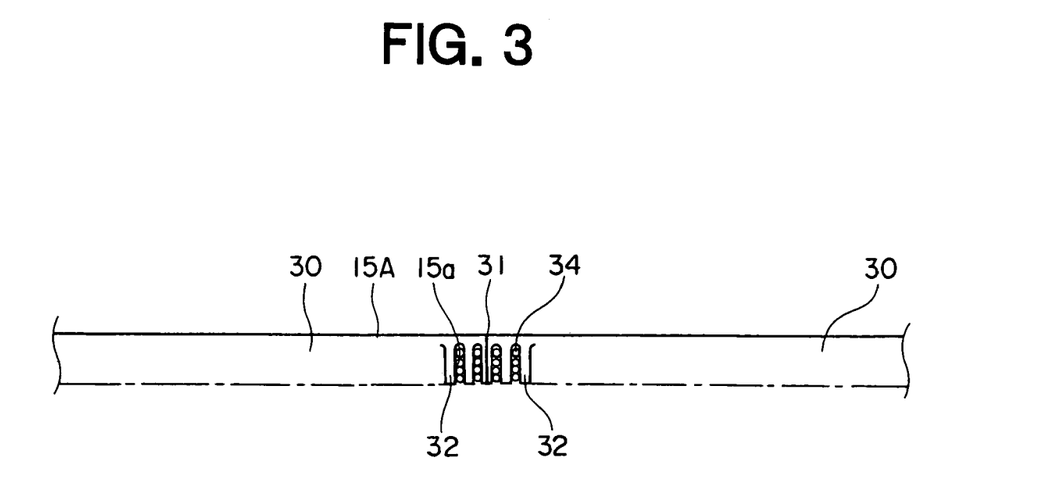
FIG. 3 is a construction view of a preliminary process in which a stator of FIG. 1 is to be deformed by bending.
Figure 4:
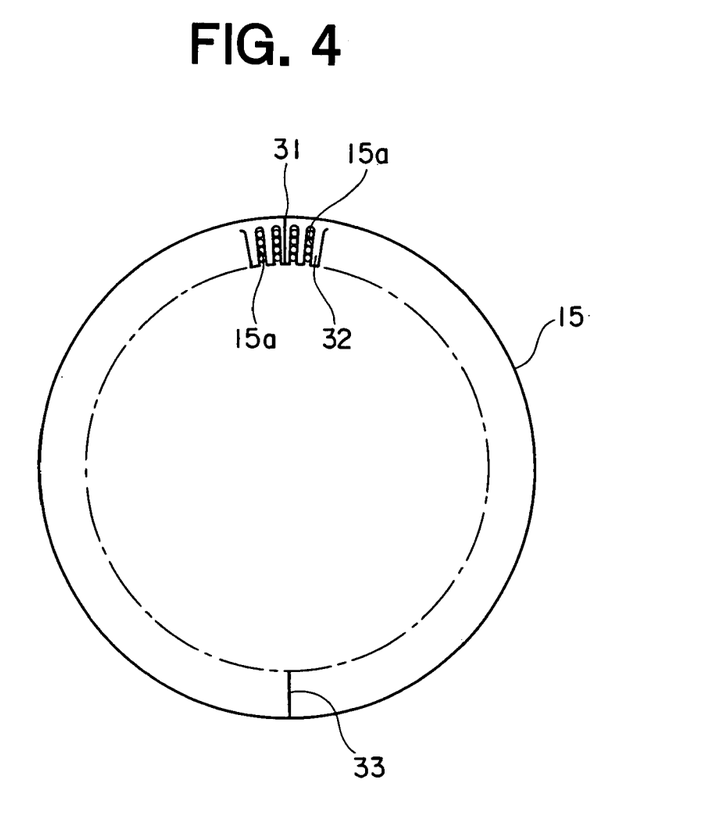
FIG. 4 is a construction diagram when an element iron core of FIG. 3 has been deformed by bending.

Referring to the drawings and first to FIG. 1, there is shown, in a cross sectional view, the construction of a vehicular alternator according to a first embodiment of the present invention. FIG. 2 is a perspective view of an element iron core 15A in a preliminary process or step in which a stator core 15 in FIG. 1 is formed. FIG. 3 is a partial construction view of the element iron core 15A in FIG. 2, and FIG. 4 is a construction view of the iron core 15 in FIG. 3 after the element stator core 15A is deformed.

This alternator, which constitutes a rotating electrical machine, includes a case 3 that is composed of a front bracket 1 and a rear bracket 2 both made of aluminum, a shaft 6 that is arranged in the case 3 with a pulley 4 being fixedly mounted on one end thereof, a Randel type rotor 7 fixedly mounted on the shaft 6, a pair of air cooling fans 5 fixedly attached to the opposite side surfaces of the rotor 7, and a stator 8 fixedly secured to an inner wall surface of the case 3.

In addition, the alternator further includes a pair of slip rings 9 that are fixedly secured to the other end of the shaft 6 for supplying current to the rotor 7, a pair of brushes 10 that are slidable on and along the slip rings 9, a brush holder 11 that receives the brushes 10, a commutator 12 that is electrically connected to the stator 8 for commutating an alternating current generated in the stator 8 into a direct current, a heat sink 17 that is fitted into the brush holder 11, and a regulator 18 that is attached to the heat sink 17 for regulating the magnitude of an alternating voltage generated in the stator 8.

The rotor 7 is composed of a rotor coil 13 that generates magnetic flux when an electric current flows therethrough, and a pair of field cores 20, 21 that are arranged so as to enclose the rotor coil 13 with their magnetic poles being formed by the magnetic flux thus generated in the field cores 20, 21. The pair of field cores 20, 21 are made of iron, and are fixedly secured to the shaft 6 with their eight claw-shaped magnetic poles 22, 23 being formed on their outer peripheral edges, respectively, in such a manner that they are arranged apart from one another at an equal pitch in the circumferential direction so as to be in opposed engagement with each other.

The stator 8 is provided with the stator core 15 that is composed of a plurality of cylindrical-shaped laminated iron cores having a plurality of axially extending slots 15a formed at a predetermined pitch in the circumferential direction, as shown in FIG. 4, and a stator winding 16 that is wound around the stator core 15.

In addition, the front bracket 1 and the rear bracket 2 have intake air holes 1a, 2a formed in the axially opposite side portions thereof, respectively, and exhaust holes 1b, 2b formed in shoulder portions thereof, respectively.

The stator core 15 is formed in such a manner that the element iron core 15A of a hexahedral shape is deformed by bending with its opposite end faces being fusion joined or bonded to each other while being placed in abutment with each other. Weld portions 33 of the element iron core 15A fusion joined to each other by means of $CO_2$ laser welding are formed into a tooth 32 between its adjacent slots 15a. Also, the element iron core weld portion 33 is continuously formed over an entire axial area of the stator core 15 from its one end to its other end along an axial direction thereof.

The element iron core weld portion 33 is formed in such a manner that the axial length of the stator core 15 is longer than the diametral (radial) length (width) thereof.

The element iron core 15A is composed of two iron core blocks 30 which are each formed of a predetermined number of rolled steel plates of a predetermined thickness laminated one over another and joined or bonded together to be integrated with one another at their outer peripheries by means of the $CO_2$ laser welding. The iron core blocks 30 are placed in abutment at their adjacent end faces with respect to each other and fusion joined or bonded to each other by means of $CO_2$ laser welding. A weld portion 31 of the iron core blocks 30 thus fusion bonded is formed into a tooth 32, similar to the element iron core weld portion 33. Also, the block weld portion 31 is continuously formed over the entire axial area of the stator core 15 from its one end to its other end along the axial direction thereof.

The block weld portion 31 are formed in such a manner that the axial length of the stator core 15 is longer than the diametral (radial) length (width) thereof, similar to the element iron core weld portion 33.

Since the element iron core 15A is composed of two iron core blocks 30, the yield or the like in the step of stamping a material in the form of rolled steel sheet into a predetermined shape can be improved.

In the vehicular alternator of the above-mentioned construction, insulators (not shown) are placed in the slots 15a, respectively, of the element iron core 15A, and thereafter conductors of the stator winding 16 are fitted into the element iron core 15A by pushing conductors 34 of the belt-shaped stator winding 16 into the slots 15a.

After this, the element iron core 15A of the hexahedral shape are deformed by bending into a cylindrical shape, and the divided surfaces of a tooth 32 of the element iron core 15A are placed into abutment at their with respect to each other and fusion joined or bonded to each other, thereby providing the stator 8.

In the vehicular alternator of the above-mentioned construction, a current is supplied from a battery (not shown) to the rotor coil 13 through the brushes 10 and the slip rings 9 to generate a magnetic flux, whereby the claw-shaped magnetic poles 22 of one field core 20 are polarized to an N pole and the claw-shaped magnetic poles 23 of the other field core 21 are polarized to an S pole under the action of the magnetic flux. On the other hand, the rotating torque of the engine is transmitted to the shaft 6 through the belt (not shown) and the pulley 4 whereby the rotor 7 is driven to rotate. As a result, a rotating field is given to the stator winding 16 so that an AC electromotive force is generated in the stator winding 16. The magnitude of the AC electromotive force is controlled by the regulator 18 that regulates the current flowing through the rotor 7. In addition, the alternating current generated by the AC electromotive force can be commutated to a direct current through the commutator 12 so as to be charged to the battery.

Figure 5:
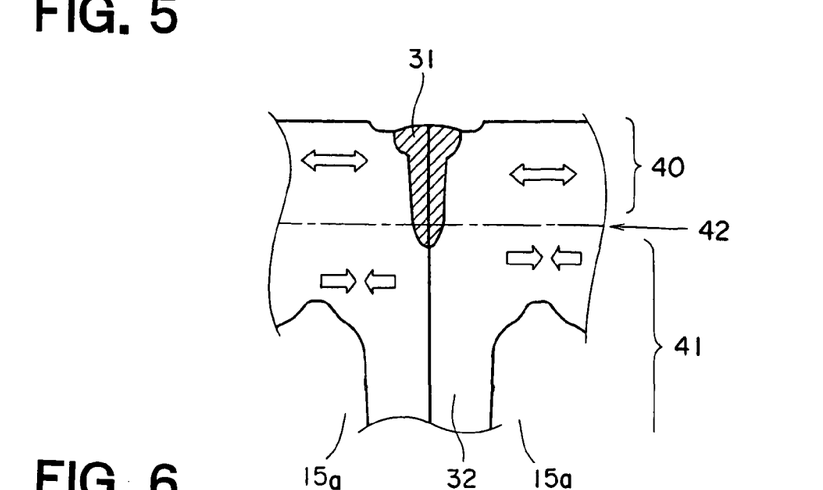
FIG. 5 is an enlarged view of essential portions of FIG. 3.

FIG. 5 is an enlarged view of the block weld portion 31 of the element iron core 15A of FIG. 3. The element iron core 15A is divided into a tensile region 40 that is an outer peripheral side of the stator core 15 in which a tensile stress is generated upon bending deformation thereof, and a compressed region 41 that is an inner side of the stator core 15, with a balance of force being kept at a boundary line 42 that is the boundary of the tensile region 40 and the compressed region 41.

Here, note that with respect to the boundary line 42, the position and mode or way thereof in which the boundary line 42 appears are various depending upon the rigidity, the thickness, etc., of the material, and an example thereof is shown in FIG. 5, while being visualized for the sake of understanding.

In the block weld portion 31, the depth of fusion reaches up to a part of the compressed region 41 while exceeding the tensile region 40 and the boundary line 42.

The reason why the depth of fusion does not reach the entire area of the compressed region 41 is that fusion bonding is unnecessary in the compressed region 41 in which forces are applied, upon bending deformation of the element iron core 15A, to the iron core blocks 30 in directions to make the adjacent end faces of the iron core blocks 30 into abutment with each other thereby to ensure a sufficient strength as bonding strength.

With respect to the element iron core weld portion 33, similar to the block weld portion 31, the depth of fusion reaches up to a part of a compressed region that is an inner side of the stator core 15 while exceeding a tensile region that is an outer peripheral side of the stator core 15.

The element iron core weld portion 33 has sufficient strength to oppose the spring back of the stator core 15 after being joined or bonded to each other by welding. Also, in the compressed region, residual stress acts in a direction to make the end faces of the element iron core 15A into abutment with each other, thereby ensuring a sufficient strength as bonding strength.

Thus, in the block weld portion 31, it is enough for the depth of fusion to reach up to a part of the compressed region 41 while exceeding the tensile region 40 and the boundary line 42, and similarly, in the element iron core weld portion 33, too, it is enough for the depth of fusion to reach up to a part of the compressed region 41 while exceeding the tensile region 40 and the boundary line 42, whereby a sufficient strength of the teeth 32 integrated in the divided surface thereof can be ensured, and at the same time, an increase in the resistance of the inner peripheral surfaces of the teeth 32 that are crossed by the main magnetic flux can be suppressed, as a result of which the vehicular alternator with high performance and high quality can be obtained without reduction of the magnetic flux.

In addition, by the lamination of a multitude of thin plates in the form of rolled steel plates one over another, it is possible to decrease a region that disturbs an eddy current suppression effect (the block weld portion 31).

Further, welding locations are unnecessary on the teeth 32 side, so the welding region required can be accordingly reduced, thus making it possible to decrease the size of welding equipment and to shorten the welding operation time can be shortened.

Here, note that the purpose of the depth of fusion reaching up to a part of the compressed region 41 while exceeding the boundary line 42 is to cope with even the case where the tensile stress acts on the part of the compressed region 41 due to magnetic exciting forces, etc.

Moreover, the element iron core weld portion 33 is formed in the teeth 32, so when the element iron core 15A of the hexahedral shape is deformed by bending and the opposite ends thereof are joined or bonded to each other by welding while being placed into abutment with each other, the welding operation can be carried out in an efficient manner without being obstructed by the stator winding 16.

Here, the element iron core weld portion 33 is formed in such a manner that the axial length of the stator core 15 is longer than the diametral length thereof, and the block weld portion 31 is also formed in such a manner that the axial length of the stator core 15 is longer than the diametral length thereof, so the region through which the magnetic flux passes increases, thereby making it possible to improve the output power and the operational efficiency of the vehicular alternator.

Here, note that the above-mentioned stator core 15 has, for example, an outside diameter of 130 mm, a core backing of 4 mm (measurement a in FIG. 8), a tensile region 40 of 2 mm, a compressed region of 2 mm, a circumferential width of 2.5 mm at the root portion of each tooth 32, and a circumferential width of 2.0 mm at the tip end of each tooth 32.

Embodiment 2

Figure 6:
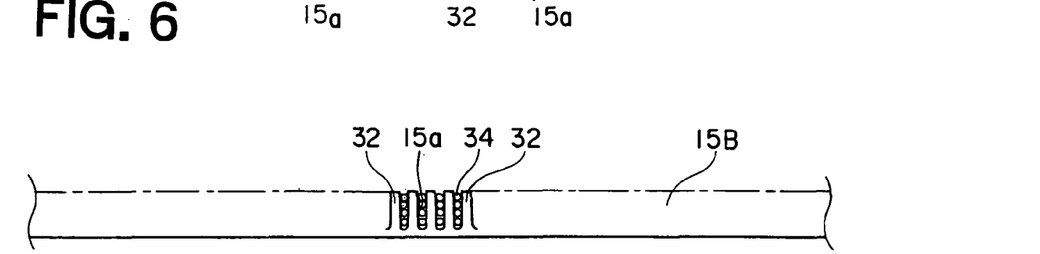
FIG. 6 is a construction view of a preliminary process in which a stator is to be deformed by bending when an element iron core in a vehicular alternator according to a second embodiment of the present invention is used.
Figure 7:
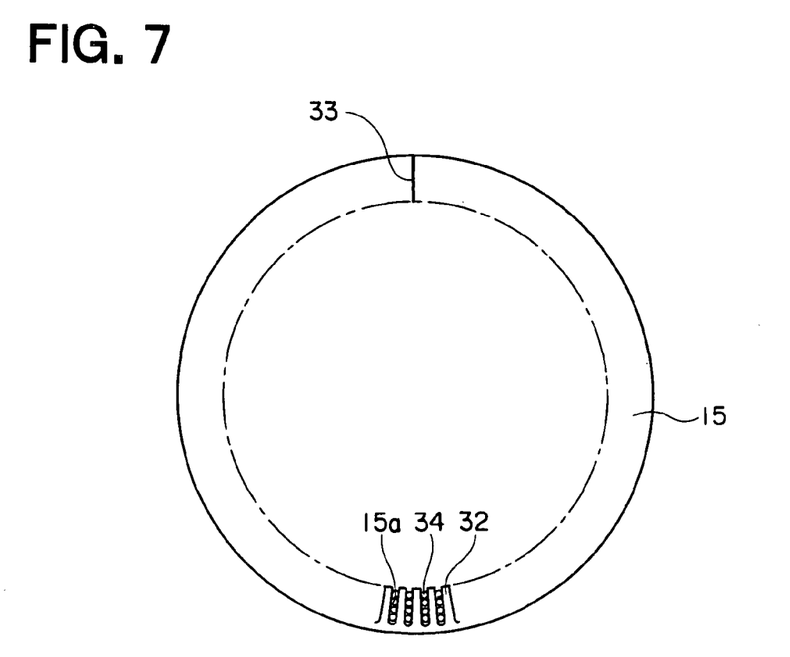
FIG. 7 is a construction view when the element iron core of FIG. 6 is deformed by bending.

In a second embodiment of the present invention, an element iron core 15B of a hexahedral shape comprising a single iron core block is used, as shown in FIG. 6, and is deformed by bending into a cylindrical shape so that the opposite end faces of the element iron core 15B are placed into abutment with each other and fusion joined or bonded to each other to form an element iron core weld portion 33, as shown in FIG. 7.

The construction of this second embodiment other than the above is similar to that of the first embodiment.

In the element iron core weld portion 33 formed in the teeth 32, the depth of fusion is up to a part of a compressed region that exceeds a tensile region and a boundary line, similar to the first embodiment. Accordingly, it is possible to reduce a welding region and decrease the size of welding equipment, thus making it possible to shorten a welding operation time.

Embodiment 3

Figure 9:
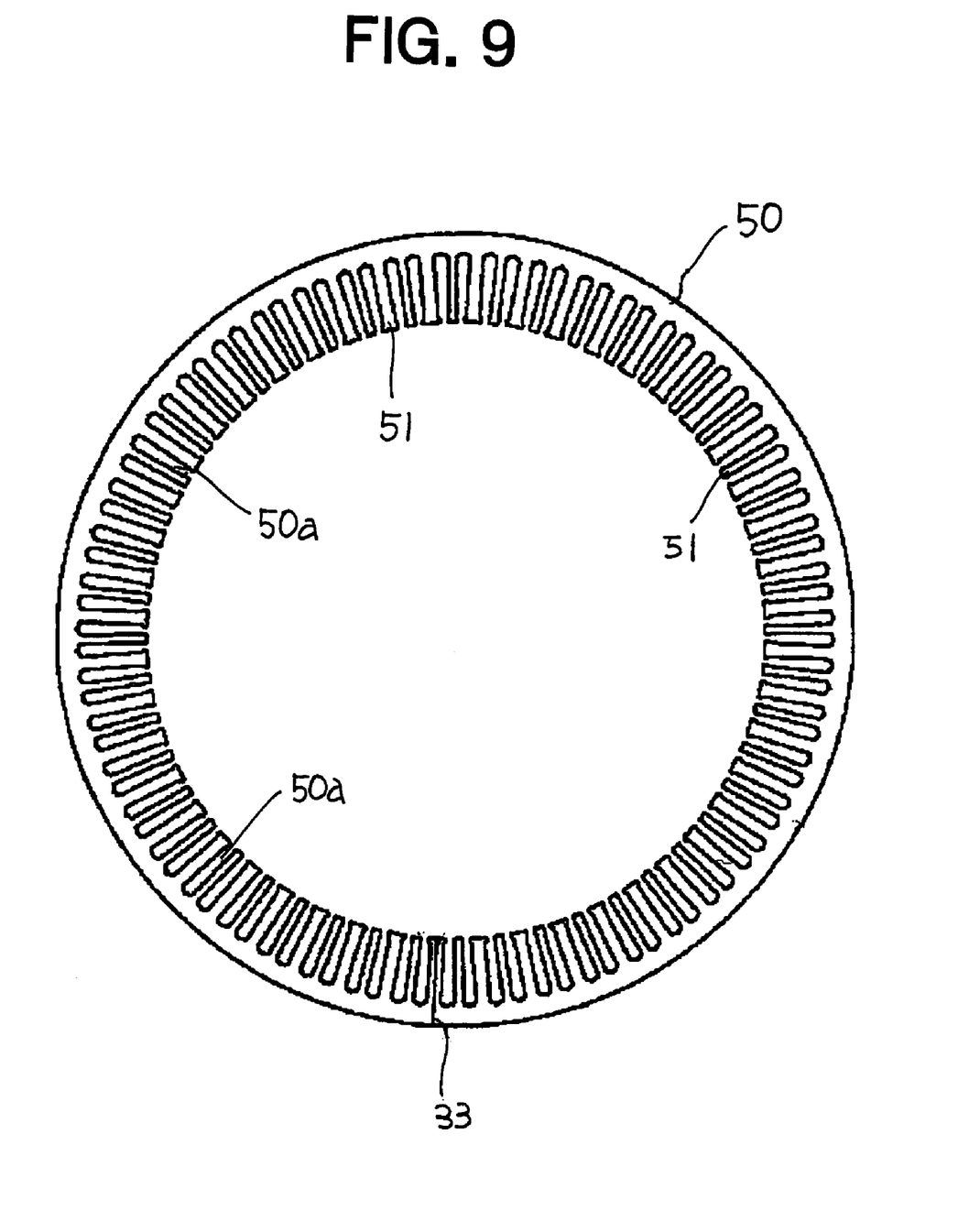
FIG. 9 is a front elevational view showing a stator core of a vehicular alternator according to a third embodiment of the present invention.
Figure 10:
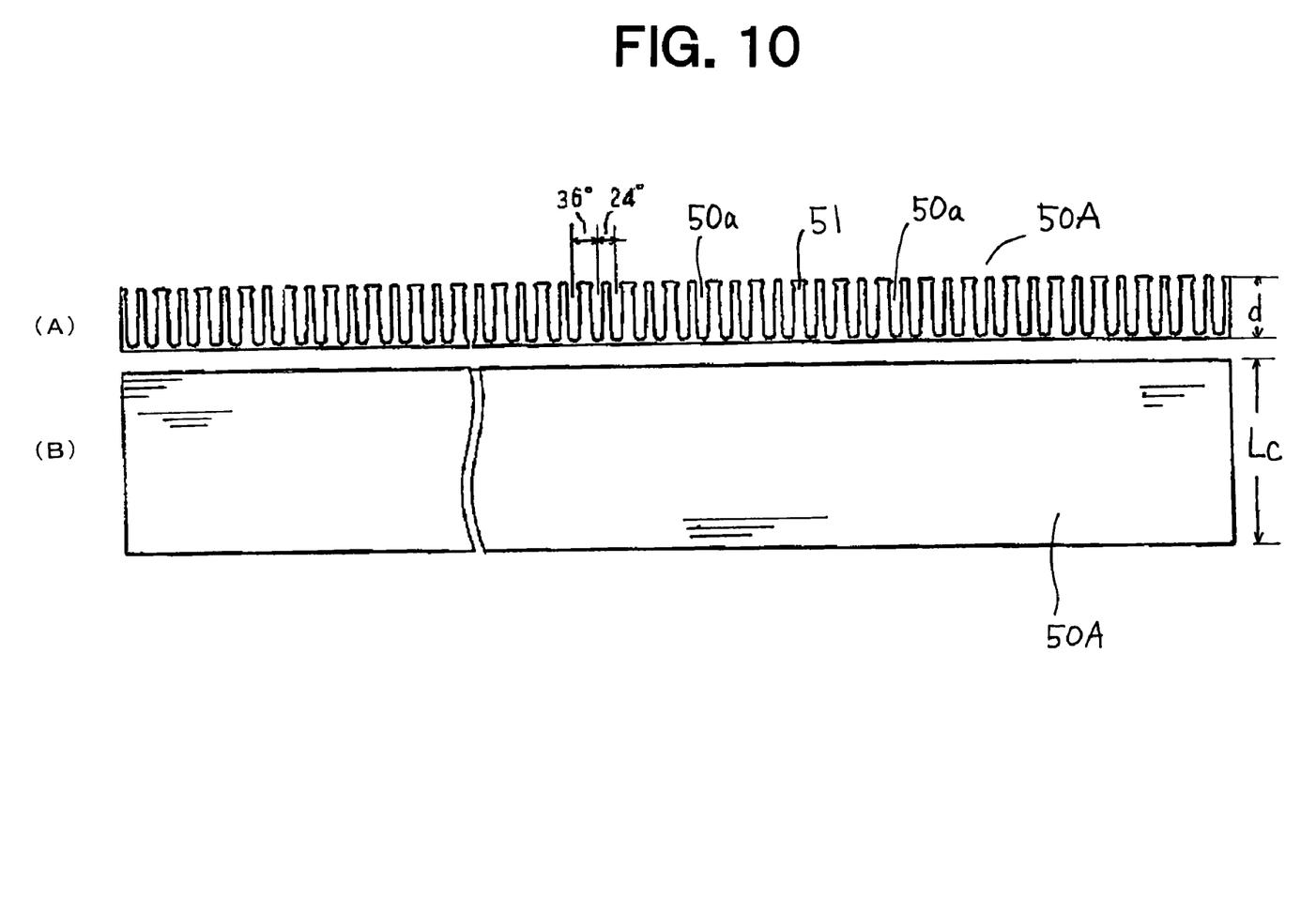
FIG. 10A is a front elevational view when a stator core is developed according to the third embodiment.
FIG. 10B is a bottom view of the stator core shown in FIG. 10A.

FIG. 9 is a front elevational view that shows a stator core 50 of a vehicular alternator according to a third embodiment of the present invention. FIG. 10A is a front elevational view when the stator core 50 is developed according to the third embodiment, and FIG. 10B is a bottom view of the stator core 50 shown in FIG. 10A.

In this third embodiment of the present invention, two sets of a first stator winding and a second stator winding (not shown) are built into the stator core 50. A rotor 7 has sixteen magnetic poles, each of which corresponds to six (2×3) phases, and 96 slots 50a and teeth 51 are formed at intervals or distances between center lines extending in diametral or radial directions of the openings of adjacent individual slots 50a, respectively, which are unequal or uneven pitches of mechanical angles of 36 degrees and 24 degrees. This unequal or uneven pitches are formed by changing the circumferential widths of individual teeth 51.

The stator core 50 is constructed as follows. That is, an element iron core 50A of a hexahedral shape comprising a single iron core block is used and deformed by bending into a cylindrical shape so that the opposite end faces of the element iron core 50A are placed into abutment with each other and fusion joined or bonded to each other by $CO_2$ laser welding to form an element iron core weld portion 33. The element iron core weld portion 33 are formed in such a manner that the stator core 15 has an axial length Lc longer than a radial length (width) d thereof. The construction of this third embodiment other than the above is similar to that of the second embodiment.

In this third embodiment of the present invention, the individual slots 50a are formed in such a manner that intervals or distances between the center lines that extend in diametral or radial directions of openings of the mutually adjacent individual slots 50a are unequal or uneven to one another, so there is obtained the following advantageous effect, as described in the specification of registered Japanese patent No. 3490659 filed by the same applicant as that of the subject application. That is, it is possible to reduce an electromagnetic sound and a wind sound of a 12f component that are very unpleasant harmonics in terms of audibility, whereby unpleasant or objectionable noise can be alleviated.

The operation and effects of this third embodiment other than the above are similar to those of the second embodiment.

Here, note that the present invention may be applied, for example, to a vehicular alternator in which the total number of slots is 72, and the number of magnetic poles is 12, or to a vehicular alternator in which the total number of slots is 120, and the number of magnetic poles is 20.

Although in the above-mentioned respective embodiments, with respect to the stator 8, the element iron core 15A, 15B or 50A is deformed by bending into a cylindrical shape after the stator winding 16 is fitted into the slots 15a, 50a, the present invention is of course not limited to such a stator.

In addition, although the block weld portion 31 and the element iron core weld portion 33 are continuously formed over the entire axial area of the stator core 15 or 50 from its one end to its other end along the axial direction thereof, they may be formed discontinuously or they may be formed at an inclination with respect to the axis of the stator core as long as a desired bonding strength can be ensured.

Moreover, the block weld portion 31 and the element iron core weld portion 33 may be formed not in the teeth 32 but instead in the bottoms of the slots 15a.

Figure 11:
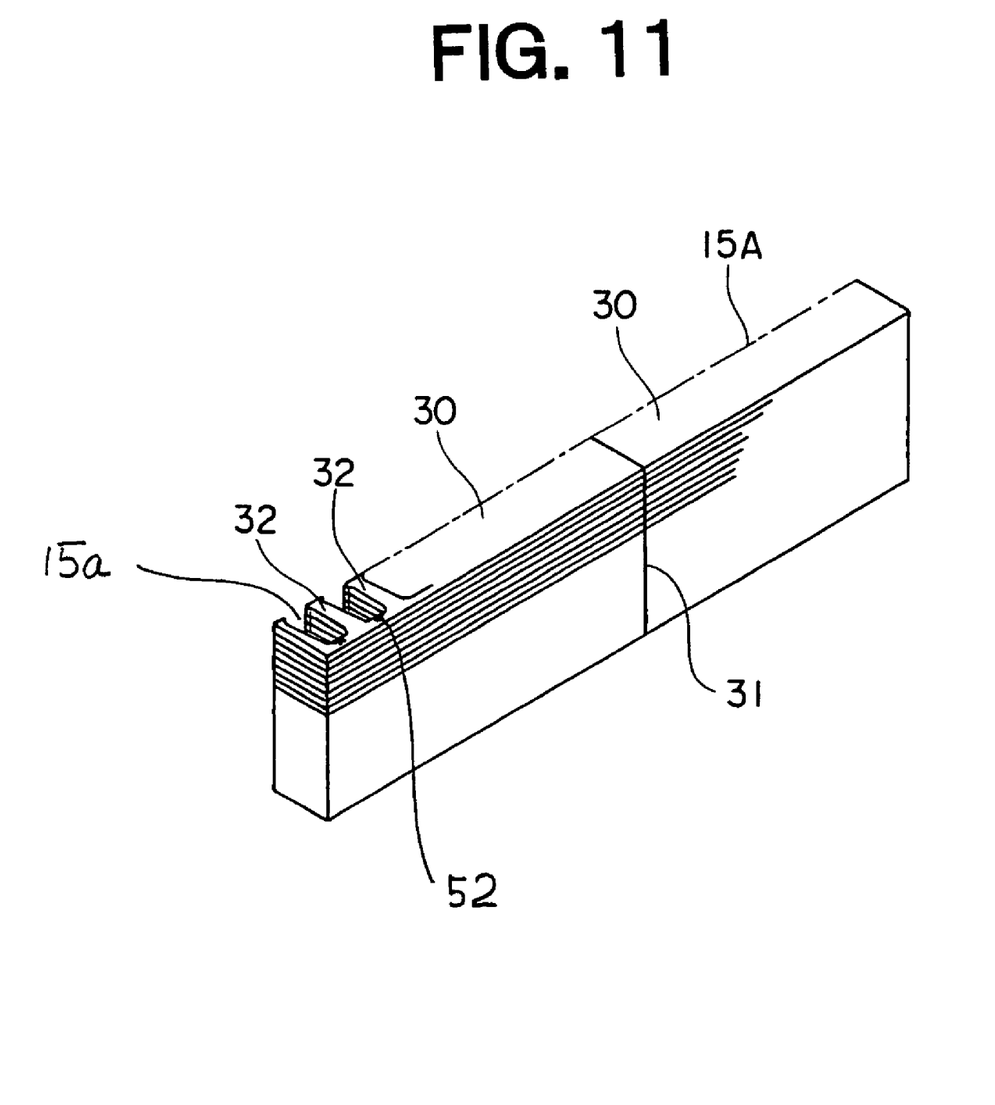
FIG. 11 is a perspective view of a modification of the stator core showing a preliminary process in which the stator core is deformed by bending.

Further, as shown in FIG. 11, by forming a notch 52 on the bottom of each slot 15a in the element iron core 15A of the first embodiment, the element iron core 15A can be easily formed into the cylindrical shape, and at the same time the roundness thereof can be improved. Of course, such a notch may be formed on the bottom of each slot 15a in the element iron core 15B of the second embodiment, or on the bottom of each slot 50a in the element iron core 50A of the third embodiment.

In addition, although in the above-mentioned embodiments, reference has been made to a rotating electrical machine in the form of an alternator for vehicular use, the present invention is not limited to rotating electrical machines for vehicular use but can also be applied to other types of rotating electrical machines such as electric motors.

While the invention has been described in terms of preferred embodiments, those skilled in the art will recognize that the invention can be practiced with modifications within the spirit and scope of the appended claims.

What is claimed is:

1. A rotating electrical machine comprising:
   a rotor having N poles and S poles alternately formed along a circumferential direction thereof;
   a stator core that is arranged so as to surround said rotor and has a plurality of axially extending slots formed at a predetermined pitch in the circumferential direction thereof; and
   a stator having a stator winding fitted in said slots;
   wherein said stator core comprises a plurality of iron core blocks abutting each other at their adjacent end faces, where the end faces are formed by dividing a tooth formed between adjacent slots of the plurality of iron core blocks, and fusion bonded at the abutting end faces to form an element iron core, and said element iron core is formed in such a manner that said element iron core is bent to deform with its opposite end faces, which are formed by dividing a tooth formed between adjacent slots of the plurality of iron core blocks, being fusion bonded to each other while being placed in abutment with each other; and
   the depth of fusion of a block weld portion thus fusion bonded reaches up to less than an entire portion of a compressed region which is generated upon bending of said stator core, and
   wherein each of the plurality of iron core blocks is formed from a predetermined number of steel plates of a predetermined thickness laminated one over another.

2. The rotating electrical machine as set forth in claim 1, wherein said stator core is formed in such a manner that said element iron core of a hexahedral shape is bent to deform with its opposite end faces, which are formed by dividing said tooth, being fusion bonded to each other while being placed in abutment with each other, and the depth of fusion of an element iron core weld portion thus fusion bonded is at least up to a tensile region in which a tensile stress of said stator core is generated.

3. The rotating electrical machine as set forth in claim 1, wherein said depth of fusion of said block weld portion partially reaches up to said compressed region in which a compressive stress of said stator core is generated.

4. The rotating electrical machine as set forth in claim 1, wherein said block weld portion has an axial length thereof larger than a diametral length thereof.

5. The rotating electrical machine as set forth in claim 1, wherein each of said slots has a notch formed in a bottom thereof.

6. The rotating electrical machine as set forth in claim 1, wherein said individual slots are formed in such a manner that distances between center lines that extend in diametral directions of openings of mutually adjacent ones of said individual slots are unequal to one another.

7. The rotating electrical machine as set forth in claim 1, wherein the number of said slots is two or more per one pole for one phase.

8. The rotating electrical machine as set forth in claim 1, wherein the depth of fusion of the element iron core weld portion fusion bonded exceeds a tensile region in which a tensile stress is generated upon bending of said stator core.

* * * * *